United States Patent [19]

Mauldin

[11] 4,194,854
[45] Mar. 25, 1980

[54] PAVER ATTACHMENT

[76] Inventor: Herbert N. Mauldin, Rte. 7 View Mont Dr., Greenville, S.C. 29609

[21] Appl. No.: 912,484

[22] Filed: Jun. 5, 1978

[51] Int. Cl.² ............................................. E01C 19/18
[52] U.S. Cl. .................................... 404/110; 280/503
[58] Field of Search ............... 404/110; 172/324, 326, 172/677, 678, 680; 280/460 R, 463, 503, 477, 478 B, 496, 456 A

[56] References Cited

U.S. PATENT DOCUMENTS

| | | | |
|---|---|---|---|
| 1,412,834 | 4/1922 | Bleoo | 280/503 |
| 1,457,928 | 6/1923 | Johnson | 404/110 |
| 1,612,191 | 12/1926 | Hubbard | 280/503 |
| 2,056,523 | 10/1936 | Jacob | 280/503 |
| 2,403,820 | 7/1946 | Miller | 404/110 |
| 2,625,278 | 1/1953 | Sensenbaugh | 280/479 A |
| 2,910,307 | 10/1959 | Jennings | 280/460 R |
| 2,954,241 | 9/1960 | Warren | 404/110 X |
| 3,095,788 | 7/1963 | Odell | 404/110 |
| 3,213,769 | 10/1965 | Smith | 404/110 |
| 3,295,866 | 1/1967 | Standfuss | 280/479 R |
| 3,396,991 | 8/1968 | Schrimper | 280/481 |

*Primary Examiner*—Nile C. Byers, Jr.
*Attorney, Agent, or Firm*—Bailey, Dority & Flint

[57] ABSTRACT

A paver attachment is illustrated for connecting a paver to a dump truck and the like having an elongated longitudinally disposed arm assembly carried on one end by the paver for raising and lowering the free end thereof to which is attached securement means for engagement with the dump truck adjacent the transmission to provide a fixed distance therebetween and to permit independent maneuvering of the paver as around curves.

6 Claims, 3 Drawing Figures

PAVER ATTACHMENT

BACKGROUND OF THE INVENTION

Many efforts have been made to provide suitable hitches as for connecting wheeled pavers to pulling vehicles such as dump trucks which carry asphalt for dumping into the hopper of the paver. For example, U.S. Pat. Nos. 3,300,234; 3,304,101 and 3,338,143 illustrate paver attachments wherein laterally extensible connections are provided for attachment outside the wheels of the dump truck. Such devices have limitations in making turns, such as when paving the ends of a cul-de-sac. There is a further limitation to the use of such devices in that uneven surfaces may result in one vehicle being excessively canted with respect to the other dislodging the connection. Another hitch exemplifying the prior art is illustrated in U.S. Pat. No. 3,213,769 wherein a forwardly projecting boom has front and rear stops serving as a securement means for attachment adjacent the rear axle of a vehicle. It is necessary to raise and lower the vehicle being pulled through a rather awkward maneuver in order to attach the rear end of the pulling vehicle to the securement means.

Accordingly, it is an important object of this invention to provide an improved paver hitch which may be power operated or to effect convenient connection and disconnection to a pulling vehicle.

Another important object of the invention is to provide a paver attachment which will permit independent operation between the respective vehicles facilitating turning and operation over rough terrain.

Still another important object of the invention is to provide a paver attachment means which will provide for ready connection adjacent an intermediate portion of the rear of the towing vehicle to insure proper spacing between the vehicles, as well as avoiding untoward separation, as well as running together of the respective vehicles when on uneven terrain.

BRIEF DESCRIPTION OF THE INVENTION

It has been found that an effective paver hitch may be provided utilizing a longitudinal forwardly extending arm assembly or boom which has pivotal attachment for raising and lowering adjacent the front of the paver with a rearwardly spaced power operated means provided with shock absorption capabilities for raising and lowering the arm assembly facilitating attachment of the securement means adjacent the rear end transmission assembly of the pulling vehicle.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
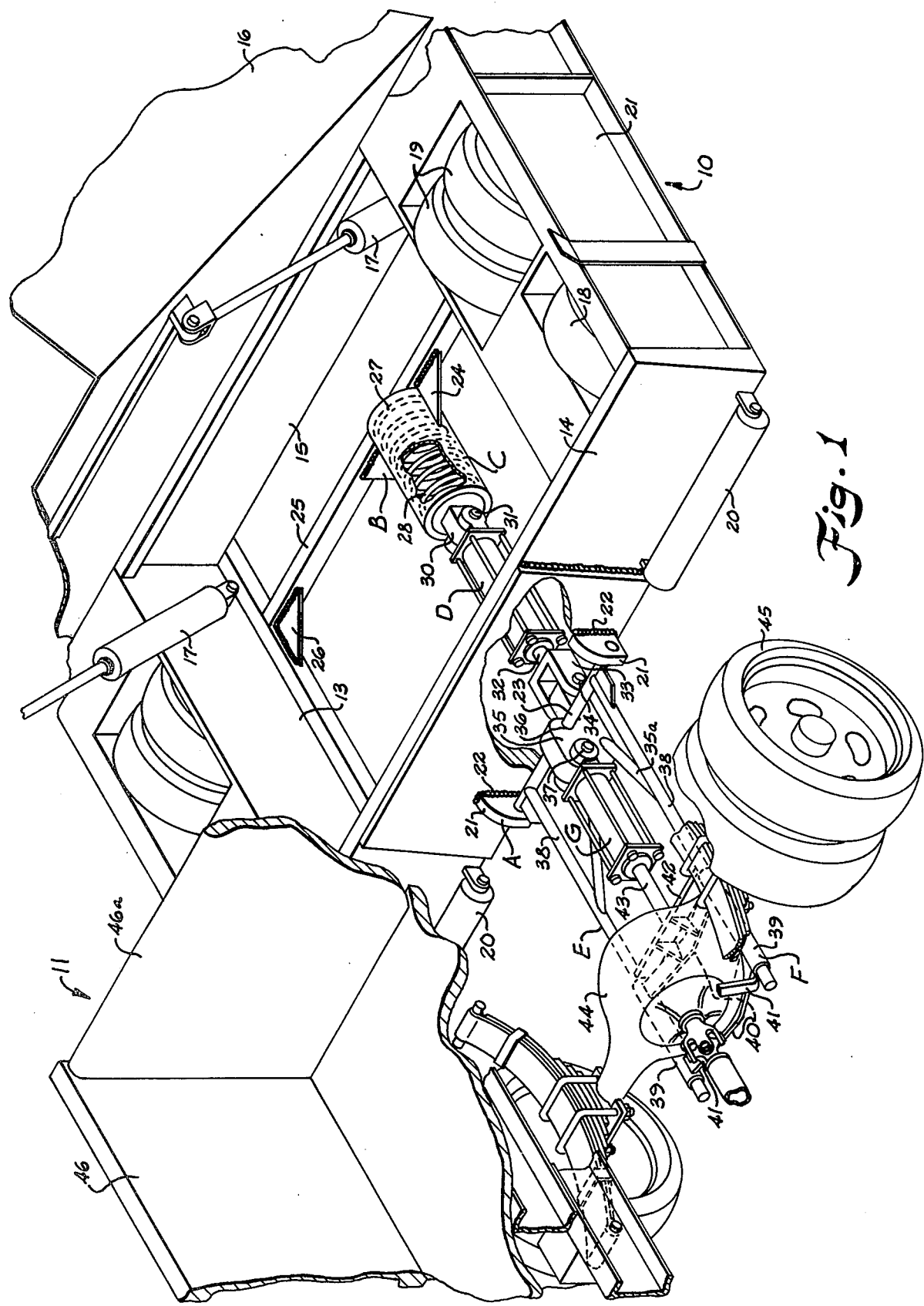
FIG. 1 is a perspective view illustrating a paver attachment constructed in accordance with the present invention connecting a paver and a dump truck.
Figure 2:
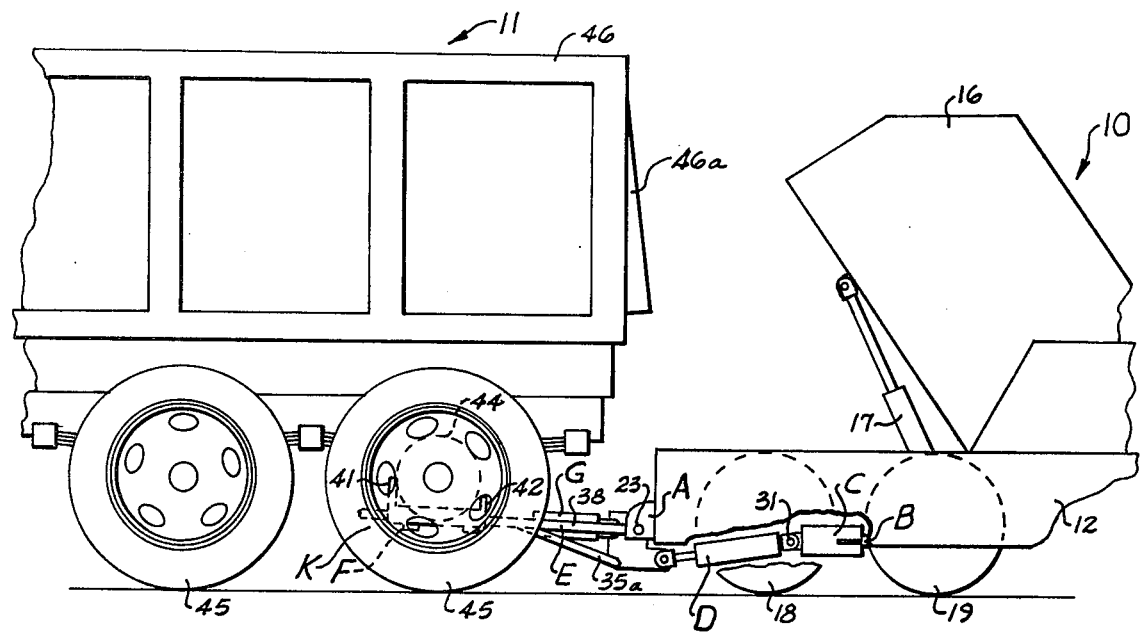
FIG. 2 is a side elevation further illustrating the paver attachment of FIG. 1.
Figure 3:
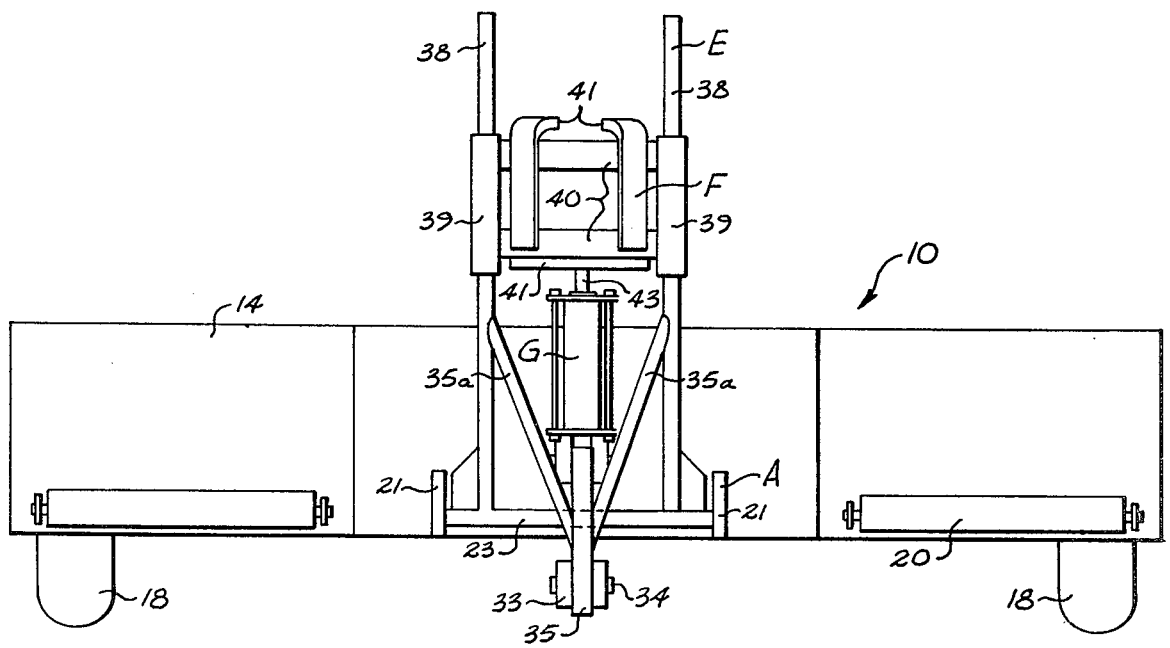
FIG. 3 is a front elevation of the paver illustrating the paver attachment in raised position.

The drawings illustrate a wheeled paver attachment for securement to a pulling vehicle. A pair of longitudinally spaced mounting means A and B are provided for fixed connection at forward and rearward locations, respectively, on the paver. Yieldable shock absorbing means C is fixed adjacent one end adjacent the rearward location. A first fluid operated assembly D is connected adjacent one end thereof adjacent the other end of the shock absorbing means. A longitudinal elongated arm assembly E is pivotally connected adjacent the forward location for raising and lowering responsive to the first fluid operated assembly. Securement means F is carried on the elongated arm assembly remote from the paver for longitudinal movement. A second fluid power operated assembly G has connection to the securement means for imparting such longitudinal movement thereto.

A paver is broadly designated at 10 in the drawings and a wheeled dump truck is broadly designated at 11. The paver 10 has a substantially rectangular frame having side members 12 and 13 bridged across the front by a frame member 14 and intermediate support is designated at 15 for carrying a hopper 16 which is suitably raised and lowered by the fluid operated cylinder assemblies 17. The paver is provided with a pair of single front wheels 18 and double intermediate wheels 19. Rollers are illustrated suitably carried for rotation adjacent the front of the frame member 14 as at 20. When utilizing hitches of the prior art, these rollers were adapted to engage the rear wheels of the pulling vehicle.

A forward mounting means A is secured adjacent the front of the paver frame member 14 and includes a pair of spaced vertical abutment means 21 fixed to the frame member 14 as by welding as at 22. The abutment means are journaled to receive a frame member 23 thus providing a pivotal mounting about an axis transverse to the paver. A rearward mounting means B is illustrated as including gusset plates 24 or other suitable means for attachment to a transverse brace 25 which may be reinforced by corner gusset plates 26.

The mounting means may further include the base of a cylinder 27 which carries therein a compression spring 28 which has secured a piston-like member 29 bearing against the compression spring, confining the spring in the cylinder, and which has pivotal connection as by the link 30 carried thereby to fluid operated cylinder assembly D. Thus, a yieldable shock absorbing means C which includes the cylinder 27 has pivotal connection about a transverse axis to the fluid operated assembly D as at 31. The first fluid operated assembly D has a piston therein provided with a piston rod 32 which is extensible being provided with a yoke 33 attached adjacent the forward end thereof to provide pivotal connection as at 34 with the free end of a lower leg of an L-shaped connector 35. The L-shaped connector 35 has pivotal connection with the adjacent portion of the upper leg of the fixed connector 35 as at 36 and has braces 35a fixing same with respect to the arm assembly E. A pivotal connection is provided between a forward portion of the L-shaped connector 35 and the second fluid power operated assembly G as at 37.

The longitudinal elongated arm assembly E includes a pair of spaced longitudinally extending bars 38 having fixed connection to the transverse member 23. Securement means F is provided in the form of a cradle slideably mounted adjacent the free forward ends of the arm assembly E. The cradle includes spaced tubular members 39 which carry concave arcuate members 40 therebetween. Upwardly extending abutments 42 are carried adjacent the forward arcuate member 40 and abutment 42 positioned rearwardly of the arcuate members 40 provides an integral connection between the piston rod 43 of the second fluid power operated assembly G. The abutment 42 also serves as a rearward stop in cooperation with the forward stop 41 for securement adjacent the rear end of the dump truck 11 adjacent the transmission 44. Rear wheels 45 carry the rear end and dump body 46 which may be elevated as to dump asphalt into the hopper of the paver. The dump body also includes a rear door 46a which may be opened to facilitate dumping.

In operation, it is a simple matter to raise and lower the arm assembly E and to move the cradle F for securement to the rear end of the dump truck. Such connection affords increased flexibility of movement between the connected vehicles which is not likely to be dislodged when traversing rough territory.

What is claimed is:

1. In a wheeled paver an attachment for securement to a pulling vehicle comprising:
   a pair of longitudinally spaced mounting means for fixed connection at forward and rearward locations on said paver;
   yieldable shock absorbing means fixed adjacent one end adjacent said rearward location;
   a first fluid operated assembly connected adjacent one end thereof adjacent the other end of said shock absorbing means;
   a longitudinal elongated arm assembly pivotally connected adjacent said forward location for raising and lowering responsive to said first fluid operated assembly;
   securement means carried on said elongated arm assembly remote from said paver for longitudinal movement; and
   a second fluid power operated assembly having connection to said securement means for imparting said longitudinal movement thereto.

2. In a wheeled paver an attachment for securement to a dump truck rear end comprising:
   a pair of longitudinally spaced mounting means for fixed connection adjacent forward and rearward locations on said paver;
   yieldable shock absorbing means connected adjacent one end thereof to said mounting means adjacent said rearward location;
   a first fluid operated assembly connected adjacent one end thereof adjacent the other end of said shock absorbing means;
   a longitudinal elongated arm assembly pivotally connected to said mounting means adjacent said forward location for raising and lowering responsive to said first fluid operated assembly; and
   securement means carried on said elongated arm assembly remote from said paver.

3. A paver hitch for attaching a wheeled paver and the like to a dump truck having a wheeled rear end with a differential comprising:
   an elongated arm assembly extending forwardly from said paver;
   transverse pivot means pivotally mounting said arm assembly adjacent a front of said paver;
   power operated means raising and lowering said arm assembly about said pivot means for connecting and disconnecting said paver to said dump truck;
   forwardly positioned stop means carried by said arm assembly limiting relative movement between said paver and said truck tending to separate said paver and said truck; and
   rearwardly positioned stop means longitudinally spaced with respect to said forward stop means carried by said arm assembly limiting relative movement between said paver and said truck tending to bring same into engagement;
   said differential being disposed between said forwardly and rearwardly positioned stop means.

4. A paver hitch for attaching a wheeled paver and the like to a dump truck comprising:
   an elongated arm assembly extending forwardly from said paver;
   transverse pivot means pivotally mounting said arm assembly adjacent a front of said paver;
   power operated means raising and lowering said arm assembly about said pivot means for connecting and disconnecting said paver to said dump truck;
   securement means carried by said arm assembly remote from said paver limiting relative movement between said paver and said truck tending to separate said paver and said truck and limiting relative movement between said paver and said truck tending to bring same into engagement; and
   said securement means includes a cradle by said arm assembly for forward and rearward adjustment for receiving a differential of said dump truck.

5. A paver hitch for attaching a wheeled paver and the like to a dump truck comprising:
   an elongated arm assembly extending forwardly from said paver;
   transverse pivot means pivotally mounting said arm assembly adjacent a front of said paver;
   power operated means raising and lowering said arm assembly about said pivot means for connecting and disconnecting said paver to said dump truck;
   securement means carried by said arm assembly remote from said paver limiting relative movement between said paver and said truck tending to separate said paver and said truck and limiting relative movement between said paver and said truck tending to bring same into engagement;
   said securement means includes a cradle by said arm assembly for forward and rearward adjustment for receiving a differential of said dump truck; and
   power operated means having a fluid operated cylinder for imparting movement to said cradle for forward and rearward adjustment.

6. A paver hitch for attaching a wheeled paver and the like to a dump truck comprising:
   an elongated arm assembly extending forwardly from said paver;
   transverse pivot means pivotally mounting said arm assembly adjacent a front of said paver;
   power operated means raising and lowering said arm assembly about said pivot means for connecting and disconnecting said paver to said dump truck;
   securement means carried by said arm assembly remote from said paver limiting relative movement between said paver and said truck tending to separate said paver and said truck and limiting relative movement between said paver and said truck tending to bring same into engagement;

said power operated means includes a fluid operated cylinder; and
shock absorbing means securing said cylinder to said paver.

* * * * *